United States Patent
Zhang (10) Patent No.: US 9,853,548 B1
(45) Date of Patent: Dec. 26, 2017

(54) ACCURATE HIGH-SIDE CURRENT EMULATION WITH AUTO-CONVERSION FOR SMART POWER STAGE APPLICATIONS

(71) Applicant: Alpha and Omega Semiconductor Incorporated, Sunnyvale, CA (US)

(72) Inventor: Zhiye Zhang, San Jose, CA (US)

(73) Assignee: ALPHA AND OMEGA SEMICONDUCTOR INCORPORATED, Sunnyvale, CA (US)

(*) Notice: Subject to any disclaimer, the term of this patent is extended or adjusted under 35 U.S.C. 154(b) by 0 days.

(21) Appl. No.: 15/425,163

(22) Filed: Feb. 6, 2017

(51) Int. Cl.
  *H02M 3/158* (2006.01)
  *H02M 1/08* (2006.01)
  *H02M 1/00* (2006.01)

(52) U.S. Cl.
  CPC ............. *H02M 3/158* (2013.01); *H02M 1/08* (2013.01); *H02M 2001/0009* (2013.01)

(58) Field of Classification Search
  CPC .................. H02M 1/08; H02M 3/1588; H02M 2001/0009
  See application file for complete search history.

(56) References Cited

U.S. PATENT DOCUMENTS

| | | | | |
|---|---|---|---|---|
| 7,045,993 B1* | 5/2006 | Tomiyoshi | .......... | H02M 3/1588 323/224 |
| 7,372,238 B1* | 5/2008 | Tomiyoshi | .......... | H02M 3/1588 323/224 |
| 7,936,160 B1* | 5/2011 | Sheehan | ................ | H02M 3/156 323/222 |
| 2004/0056644 A1* | 3/2004 | Wang | .................. | H02M 3/1588 323/288 |
| 2007/0019450 A1* | 1/2007 | Tiew | ...................... | H02M 3/156 363/98 |
| 2009/0079409 A1* | 3/2009 | Chang | ................... | H02M 3/157 323/284 |
| 2009/0315527 A1* | 12/2009 | Kung | .................... | H02M 3/158 323/282 |
| 2010/0213911 A1* | 8/2010 | Oki | ........................ | H02M 3/156 323/283 |
| 2011/0018516 A1* | 1/2011 | Notman | .............. | H02M 3/1588 323/284 |
| 2012/0235652 A1* | 9/2012 | Sheng | ................... | H02M 3/156 323/271 |

(Continued)

*Primary Examiner* — Yusef Ahmed
(74) *Attorney, Agent, or Firm* — JDI Patent; Joshua D. Isenberg; Robert A. Pullman (57) ABSTRACT

A current detection circuit for detecting a current in a Switch Mode Power Supply (SMPS) having a first switch and a second switch coupled in series and an output filter including an inductor and a capacitor coupled to a switch node formed by the first and second switches, has a current sensing circuit for sensing a current across the second switch and generating a current sensing signal indicating current information of the second switch, and a current emulation circuit for emulating current information of the first switch. The current emulation circuit includes an inductance sensing circuit for acquiring a real-time rate of change in inductor current and an AC emulation circuit for computing the AC portion of the current information of the first switch based on the real-time rate of change in inductor current.

18 Claims, 6 Drawing Sheets

(56) References Cited

U.S. PATENT DOCUMENTS

| | | | |
|---|---|---|---|
| 2012/0293144 A1* | 11/2012 | Chang | H02M 3/1588 323/271 |
| 2014/0084883 A1* | 3/2014 | Tanabe | H02M 3/1582 323/271 |
| 2014/0177289 A1* | 6/2014 | Chen | H02M 3/33515 363/21.13 |
| 2014/0239925 A1* | 8/2014 | Tanabe | H02M 3/1582 323/271 |
| 2014/0253079 A1* | 9/2014 | Ding | H02M 3/156 323/283 |
| 2014/0347078 A1* | 11/2014 | Qin | G01R 19/0092 324/713 |
| 2015/0222171 A1* | 8/2015 | Nguyen | H02M 1/08 323/282 |
| 2015/0280544 A1* | 10/2015 | Wang | H02M 1/32 323/285 |
| 2016/0006358 A1* | 1/2016 | Chen | H02M 3/33507 363/21.16 |
| 2016/0036326 A1* | 2/2016 | Sreenivas | H02M 3/158 323/271 |
| 2016/0105111 A1* | 4/2016 | Yang | H02M 3/1563 323/271 |
| 2016/0109488 A1* | 4/2016 | Dearborn | H02M 3/156 324/76.11 |
| 2016/0301307 A1* | 10/2016 | Huang | H02M 3/156 |

* cited by examiner

ACCURATE HIGH-SIDE CURRENT EMULATION WITH AUTO-CONVERSION FOR SMART POWER STAGE APPLICATIONS

FIELD OF THE DISCLOSURE

This disclosure relates to integrated circuits and more specifically current detection circuit for detecting a current in a Switch Mode Power Supply (SMPS).

BACKGROUND OF INVENTION

Figure 1:
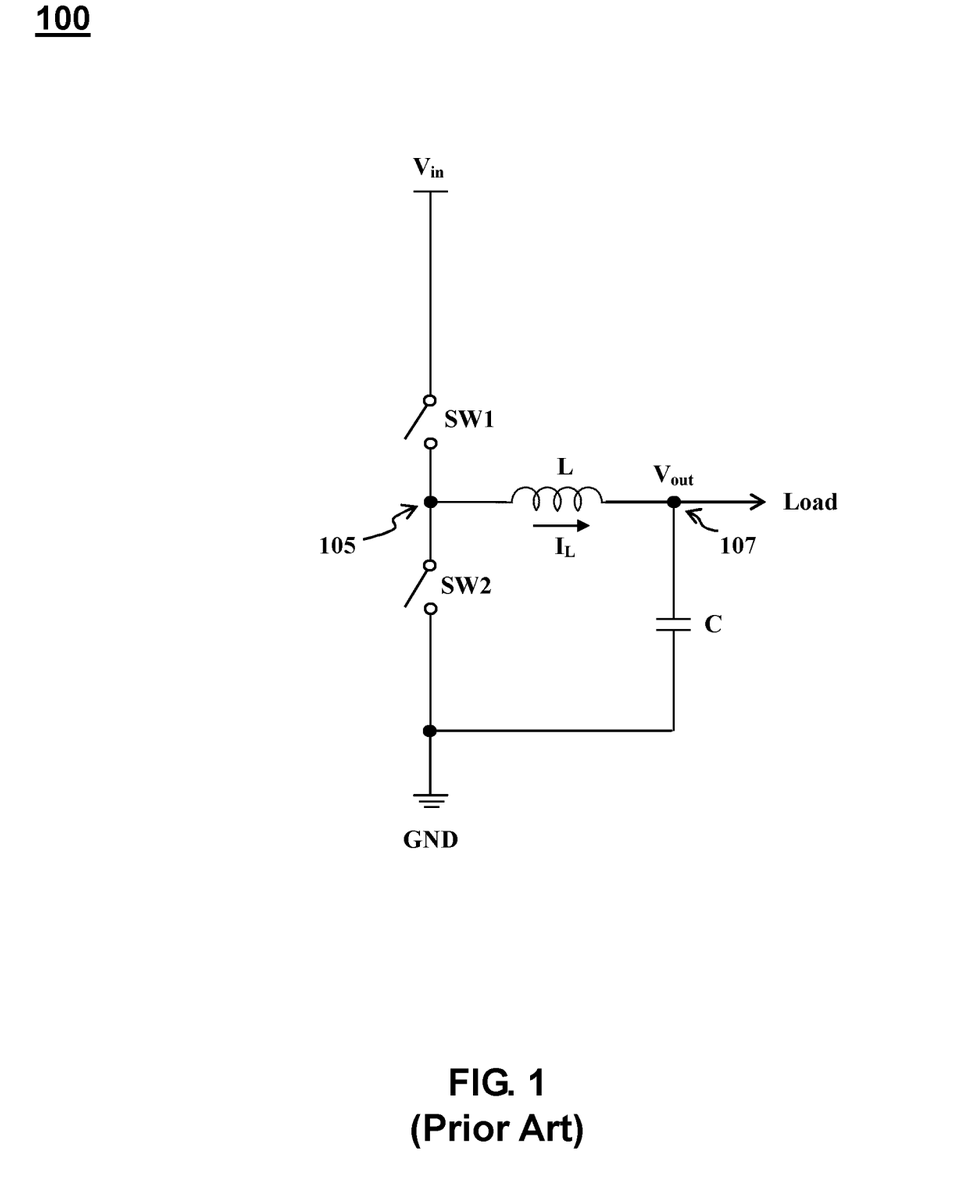
FIG. 1 is a schematic diagram illustrating a conventional switching mode power supply (SNIPS).

Integrated circuits, such as microprocessors and memory devices, include many metal-oxide-semiconductor field-effect transistors (MOSFETs), which provide the basic switching functions to implement logic gates, data storage, power switching, and the like. In one application, MOSFETs have been widely employed in Switching Mode Power Supplies (SMPS) because they are power efficient and thermally efficient. For example, a SMPS, such as a buck converter, converts an input voltage to an output voltage and supplies a load. FIG. 1 shows a conventional SMPS, which includes power switching elements SW1 and SW2 coupled in series across the input voltage source. Power switching element SW1 is coupled to the voltage supply ($V_{in}$) and power switching element SW2 is connected to ground (GND). Power switching element SW1 is also referred to as high-side (HS) switching element and power switching element SW2 as low-side (LS) switching element. Power switching elements SW1 and SW2 may be driven by a HS and a LS driver (not shown) respectively. An output filter including an inductor (L) and a capacitor (C) is connected to a junction 105 (i.e., phase node or switch node) formed by the pair of switching elements SW1 and SW2 for providing an output voltage ($V_{out}$) to a load. Through the switching elements SW1 and SW2, the output inductor L is alternately switched with one side to input voltage $V_{in}$ and a ground level GND. The output voltage $V_{out}$ can thus be generated to be higher or lower than the input voltage level $V_{in}$ by controlling the ON and OFF actions of the switching elements SW1 and SW2 via a controller (not shown). The output voltage $V_{out}$ is buffered on the capacitor C. A load (not shown) may be coupled to output node 107, and a current $I_L$ can be supplied by the inductor L to the load.

The power supply is the key element in any electronic device and its performance would affect power efficiency, product safety and product performance. Thus, it is necessary for the power supply to include a power monitoring system to understand its loading environment. Specifically, the power monitoring system may protect the power supply from overloading and short-circuit conditions by self-monitoring its current delivery. Accordingly, power monitoring systems usually need a current sensing circuit for acquiring current information.

For high-performance computing applications with SNIPS, it is essential to acquire the real-time current information for both HS and LS switching elements. The current information should include an Alternating Current (AC) portion and a Direct Current (DC) portion of the actual current supplied by the inductor to the load for accurate control, phase current sharing and power monitoring. In the recent computing applications, the conversion ratio keeps smaller and the switching frequency needs to be higher. As a result, the output current per phase gets higher. In some cases, the HS switching element may need to carry 100A current within 100 nanoseconds. However, due to diode reverse recovery, loop parasitic inductance and other issues, it becomes a challenge to accurately acquire or sense high-side current information.

It is within this context that embodiments of the present invention arise.

BRIEF DESCRIPTION OF THE DRAWINGS

Objects and advantages of aspects of the present disclosure will become apparent upon reading the following detailed description and upon reference to the accompanying drawings in which.

DESCRIPTION OF THE SPECIFIC EMBODIMENTS

Several designs have been proposed for current sensing in a SMPS to monitor its current information. The most basic form of a current sensing circuit is through the use of a sense resistor in the current-flowing path. Specifically, the current $I_L$ in a SMPS, such as the converter shown in FIG. 1, may be sensed by using a shunt resistor coupled in series to the output inductor L. The current $I_L$ causes a voltage drop across the shunt resistor, and the current $I_L$ may be obtained by sensing the voltage difference between the input and output nodes of the shunt resistor. This design however may not be desirable due to the power loss incurred by the shunt resistor.

INTRODUCTION

Figure 2:
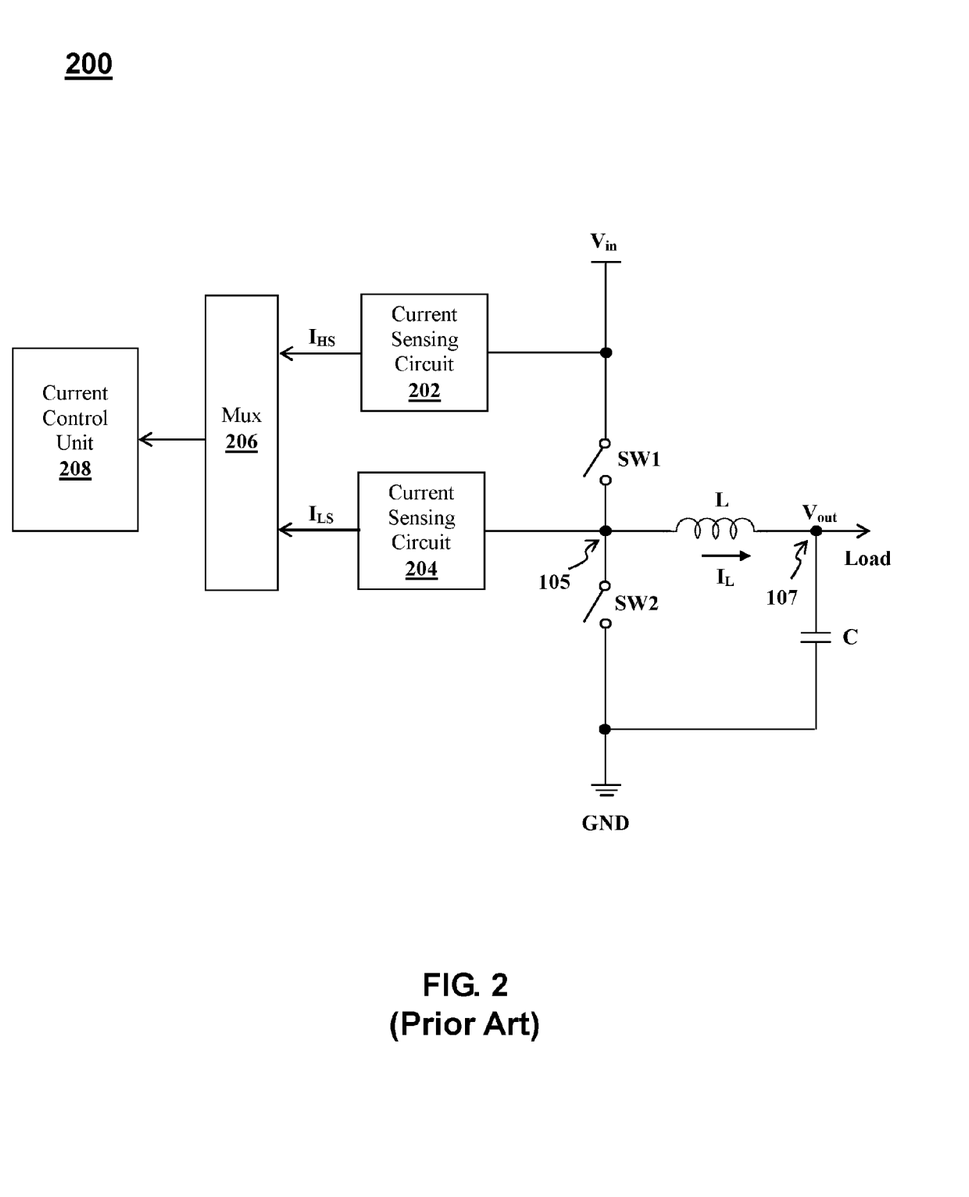
FIG. 2 is a schematic diagram illustrating one example of a conventional configuration of a SNIPS with a current detection and control circuit.

FIG. 2 shows another example of a conventional SMPS with a current detection and control circuit. The conventional SMPS 200 includes a HS switching element SW1 and a LS switching element SW2 coupled in series across the input voltage source as the SMPS 100 of FIG. 1. An output filter including an inductor (L) and a capacitor (C) is connected to a junction 105 (i.e., phase node or switch node) formed by the pair of switching elements SW1 and SW2 for providing the output voltage ($V_{out}$) to a load. The output voltage $V_{out}$ can thus be generated to be higher or lower than the input voltage level $V_{in}$ by controlling the ON and OFF actions of the power switching elements SW1 and SW2 via a controller (e.g., a Pulse Width Modulation (PWM) controller) (not shown).

In order to sense the inductor current $I_L$, two current sensing circuits 202 and 204 are coupled across the switching elements SW1 and SW2 respectively. When a control signal (e.g., a PWM signal) is in HIGH logic state, the HS switching element SW1 is turned on and the current $I_L$ flowing through the inductor increases. At this point, a current sensing signal generated from the current sensing circuit 202 includes HS current information $I_{HS}$. When the control signal is in a LOW logic state, the LS switching element SW2 is turned on and the current $I_L$ flowing through the inductance L decreases. At this point, the current sensing signal generated from the current sensing circuit 204 includes LS current information $I_{LS}$. A multiplexer 206 outputs a current signal containing current information of the inductor L to a current control unit 208 based on the HS and LS current information supplied from the current sensing circuits 202 and 204.

This design requires two current sensing circuits. In one example, the current sensing circuit 202 or 204 may include a senseFET. A senseFET may be an identical transistor to the switching element SW1 or SW2 but smaller in size. The senseFETs can sense the current across the corresponding switching element with a current-mirror configuration. However, the drawback of this design is the accuracy in the HS current information. Since parasitic inductance and LS diode recovery may cause HS current ringing, the resulting oscillating current may not reflect accurate HS current information.

Another proposed design to acquire HS current information includes one current sensing circuit for sensing LS current, and a current emulation circuit for emulating HS current. The HS current may be emulated based on equation (1) below.

$$I_{HS} = I_{LS\text{-}valley} + (V_{in} - V_o)/L \qquad (1)$$

$I_{LS\text{-}valley}$ is the minimum inductor current value (or valley) of the LS switching element SW2 over the switching cycle. It can be obtained by using a sample and hold circuit. However, the inductance value of the inductor L required in the equation (1) is usually unknown and has to be preset. Thus, the emulated HS current cannot be accurate. In addition, the inductance value may degrade over time and change according to the environment (e.g., temperature changes).

It is noted that accurate HS current information is very critical in Smart Power Stage (SPS) applications and it is a requirement for Intel's VR 13 specification for voltage regulators for the next generation servers. Since prior art designs either have oscillation issues (or ringing issues) on the HS current, or require preset or estimate inductance values for HS current emulation, it is not possible for these designs to be implemented in SPS applications which require high switching frequency, low duty cycle and large current.

Aspects of the present disclosure propose a method to emulate HS current and supply the accurate HS current emulation with auto-conversion for SPS applications. Specifically, the HS current information is automatically converted according to the real-time rate of change in inductor current. Since aspects of the present disclosure eliminate the need to preset or estimate an inductance values, the HS current information stays accurate even if inductor in the power supply degrades over time or changes due to the environment.

SMPS with Current Detection and Control Circuit

Figure 3:
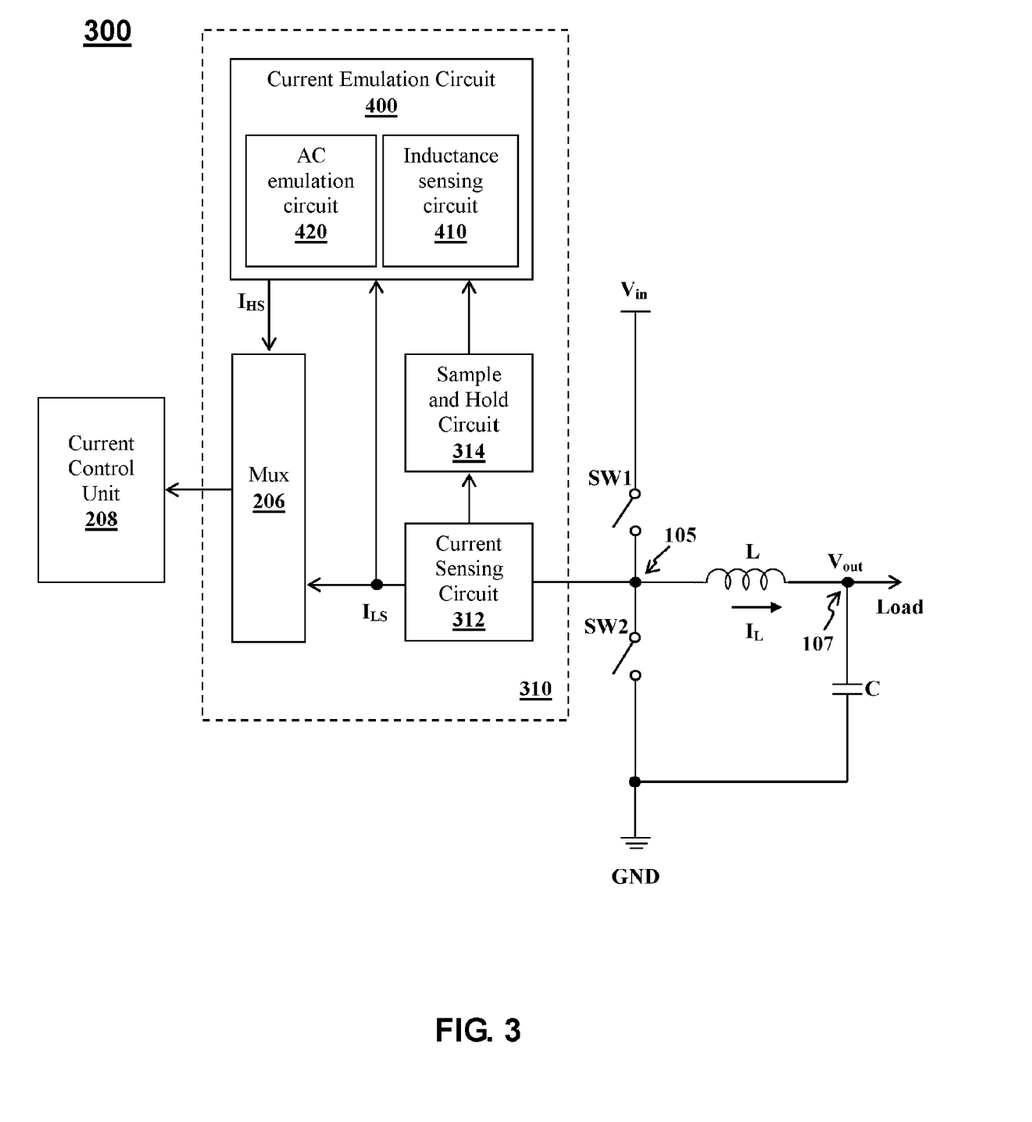
FIG. 3 is a schematic diagram illustrating an overview of a SNIPS with a current detection and control circuit according to aspects of the present disclosure.

FIG. 3 illustrates a SMPS with a current detection and control circuit according to aspects of the present disclosure. The SMPS 300 comprises a HS switching element SW1 and a LS switching element SW2, an inductor L and a capacitor C. The SMPS 300 further comprises a current detection circuit 310 and a current control unit 208. Current detection unit 310 is used to detect a real-time inductor current $I_L$ in the SMPS. Current detection unit 310 has an input coupled to the switch node 105 and an output providing an inductor current signal indicating the real-time inductor current $I_L$ to the current control unit 208. Control unit 208 may use the real-time current information for current monitoring and control. As an example, the control unit 208 may, according to the inductor current signal, control/adjust the SMPS's voltage ($V_{out}$) and current output ($I_L$) to the load (e.g., CPU), arrange the current balancing and sharing for multiple phases, monitor and report the power consumption, and/or alarm the SMPS and enable the protection features such as current limit.

Specifically, the SMPS 300, as the SMPS 200 in FIG. 2, includes a HS switching element SW1 and a LS switching element SW2 coupled in series across the input voltage source. The HS switching element is coupled to the voltage supply ($V_{in}$) and the LS switching element SW2 is connected to ground (GND). In one embodiment, the HS switching element SW1 and the LS switching element SW2 each comprise a transistor, e.g., a Metal Oxide Semiconductor Field Effect Transistor (MOSFET).

The HS and LS switching elements SW1 and SW2 are controlled by a Pulse Width Modulation signal generated from a controller (not shown). In one embodiment, the HS switching element SW1 is controlled by a PWM signal, and the LS switching element SW2 is controlled by a complementary pattern of the PWM signal or a NOT signal of the PWM signal. Thus, when the PWM signal is in a first logic state (e.g., a HIGH logic signal) and the NOT signal of the PWM signal is LOW, the HS switching element SW1 is turned on and the LS switching element SW2 is turned off. At this time, current flows from the input node through HS switching element SW1 to the inductor L. An inductor current $I_L$ which flows through inductor L equals a HS current $I_{HS}$ which flows through the HS switching element SW1, and a LS current $I_{LS}$ which flows through the LS switching element SW2 is zero. At the same time, the inductor current value $I_L$ increases. When the PWM signal is in a second logic state (e.g., in logic LOW), NOT signal of the PWM signal is in logic HIGH, the HS switching element SW1 is turned off and the LS switching element SW2 is turned on. Current flows from ground through the LS switching element SW2 to the inductor L. During this time period, inductor current $I_L$ equals the LS switching element SW2, and the HS switching element SW1 is zero. And at the same time, the inductor current value $I_L$ decreases.

Referring back to FIG. 3, current detection unit 310 may include a current sensing circuit 312, a sample and hold circuit 314, a current emulation circuit 400 and a multiplexer 206.

The current sensing circuit 312 is used to sense a current across the LS switching element SW2 and generate a current sensing signal indicating current information of the LS switching element SW2 (i.e., LS current $I_{LS}$). The current sensing circuit 312 has an input coupled to the switch node 105 and an output for provide the current sensing signal to the sample and hold circuit 314 and the multiplexer 206. In one embodiment, the current sensing circuit 312 may comprise a conventional current sensing element, such as a senseFET.

The sample and hold circuit 314 is used to sample the current sensing signal supplied from the current sensing circuit 312 to obtain current values of the LS switching element SW2 including its valley current value and a peak current value. The sample and hold circuit 314 has an input configured to receive the current sensing signal provided from the current sensing circuit 312 and an output configured to supply a sampled current signal indicating current values of the LS switching element SW2 to the current emulation circuit 400. In one embodiment, the sample and hold circuit 314 is configured to sample the current sensing signal to obtain the minimum inductor current value of the LS switching element SW2 ($I_{LS\text{-}valley}$) and supply it to the current emulation circuit 400. The valley current $I_{LS\text{-}valley}$ can be obtained by sampling the current sensing signal at the moment when LS switching element SW2 is turned off. In another embodiment, the sample and hold circuit 314 can also be configured to sample the current sensing signal to obtain the peak inductor current value of the LS switching element SW2 ($I_{LS\text{-}peak}$) and supply it to the current emulation circuit 400. The peak current $I_{LS\text{-}peak}$ can be obtained by sampling the current sensing signal at the moment when LS switching element SW2 is turned on. The sample and hold circuit 314 may comprise a conventional sample and hold circuit.

The current emulation circuit 400 is used to emulate current across the HS switching element SW1. The current emulation circuit 400 has a first input configured to receive sampled current values from the sample and hold circuit 314, and an output configured to provide a current emulation signal indicating current information of the HS switching element SW1 (i.e., the HS current $I_{HS}$) to the multiplexer 206. The current emulation circuit 400 further comprises an inductance sensing circuit 410 for acquiring real-time inductance value of the inductor L and an AC emulation circuit 420 for computing an AC portion of the HS current based on the real-time inductance value of the inductor L. Detailed description of the current emulation circuit 400 will be discussed below in associated with FIG. 4.

Figure 4:
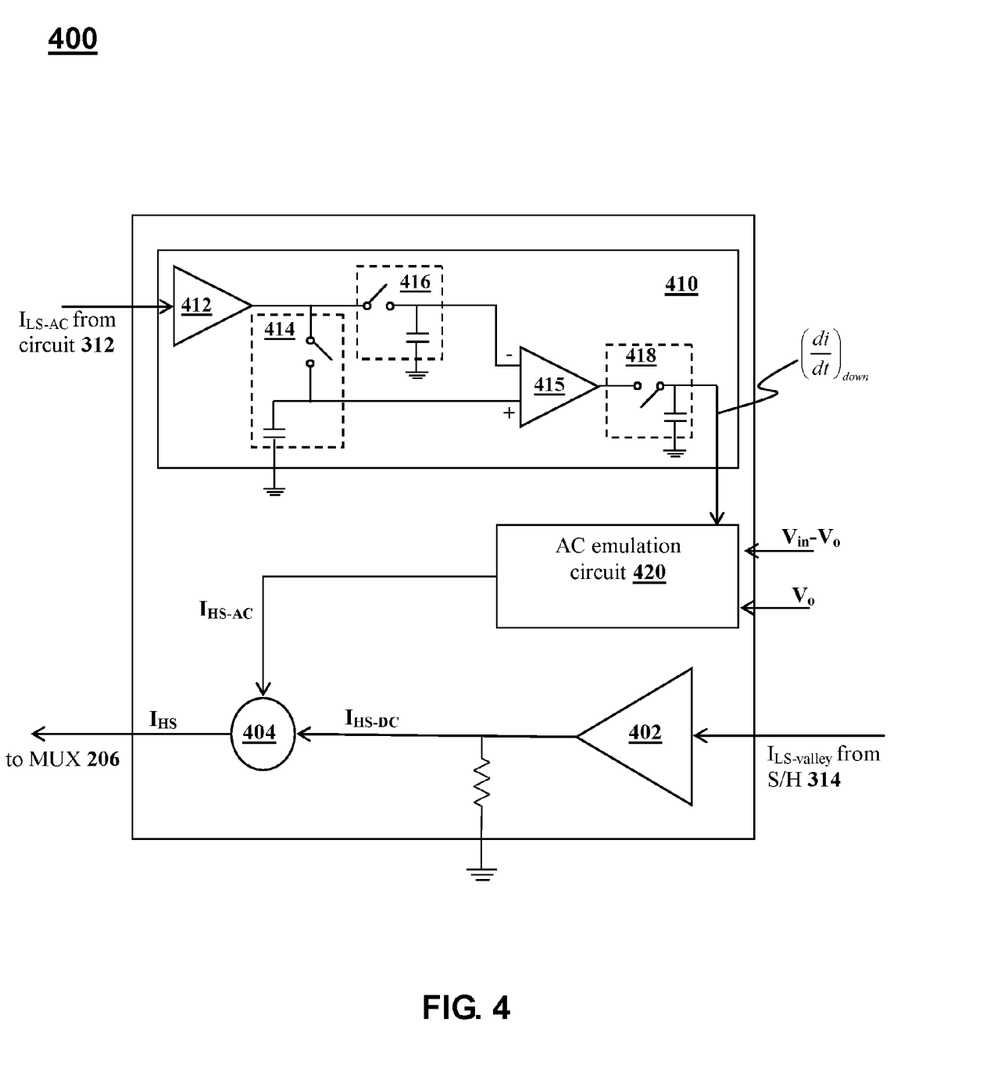
FIG. 4 is a schematic diagram illustrating a current emulation circuit according to aspects of the present disclosure.

The multiplexer 206 is used to generate an inductor current signal indicating the current $I_L$ in the SMPS based on the current sensing signal and the current emulation signal. The multiplexer 206 has a first input coupled to the current sensing circuit 312 for receiving the current sensing signal indicating LS current $I_{LS}$, a second input coupled to the current emulation circuit 400 for receiving the current emulation signal indicating the HS current $I_{HS}$ and an output for supplying the inductor current signal indicating the current $I_L$ in the SMPS to the current control unit 208 for current monitoring and control FIG. 4 illustrates a current emulation circuit according to aspects of the present disclosure. The emulation circuit 400 is used to generate the current emulation signal indicating the current across the HS switching element SW1. It is noted that the current emulating signal includes an AC portion ($I_{HS\text{-}AC}$) and a DC portion ($I_{HS\text{-}DC}$) of the HS current ($I_{HS}$) The DC portion of the HS current ($I_{HS\text{-}DC}$) can be obtained based on the LS valley current $I_{LS\text{-}valley}$ supplied from the sample and hold circuit 314. The AC portion of the HS current ($I_{HS\text{-}AC}$) can be obtained through the inductance sensing circuit 410 and the AC emulation circuit 420.

With respect to the DC portion, the current emulation circuit 400 comprises an amplifier 402 configured to receive the input value indicating a magnitude of the valley current $I_{LS\text{-}valley}$ of the LS current from the sample and hold circuit 312 and converts it into DC portion of the HS current $I_{HS\text{-}DC}$. The DC portion of the HS current $I_{HS\text{-}DC}$ is then supplied to the summing circuit 404 for combining with the AC portion of the HS current.

With respect to the HS AC portion ($I_{HS\text{-}AC}$), it can be obtained according to the equation (2) below:

$$I_{HS\text{-}AC} = (V_{in} - V_o)/L \quad (2)$$

The voltage values for input voltage $V_{in}$ and output voltage $V_o$ may be obtained by real-time sensing. The sensed voltages can be provided to the current emulation circuit 400 as inputs. Thus, with reference to the equation (2), an accurate inductance value is the key factor for obtaining a HS AC current. Since inductance value L equals a voltage induced across the inductor (e.g., $V_o$) divided by a rate of change in inductor current (di/dt) as the equation (3) below, it is necessary to obtain two current measurements and an elapsed time between them to calculate the rate of change in inductor current.

$$L = V_o/(di/dt) \quad (3)$$

Accordingly, the current emulation circuit 400 comprises the inductance sensing circuit 410 for acquiring the rate of change in inductor current (di/dt), and the AC emulation circuit 420 for computing AC portion of the HS current $I_{HS\text{-}AC}$ based on the equations (2) and (3). It is noted that based on the equations (2) and (3), the AC portion of the HS current $I_{HS\text{-}AC}$ can be obtained by the equation (4) below:

$$I_{HS\text{-}AC} = (V_{in} - V_o)/V_o(di/dt) \quad (4)$$

Figure 4A:
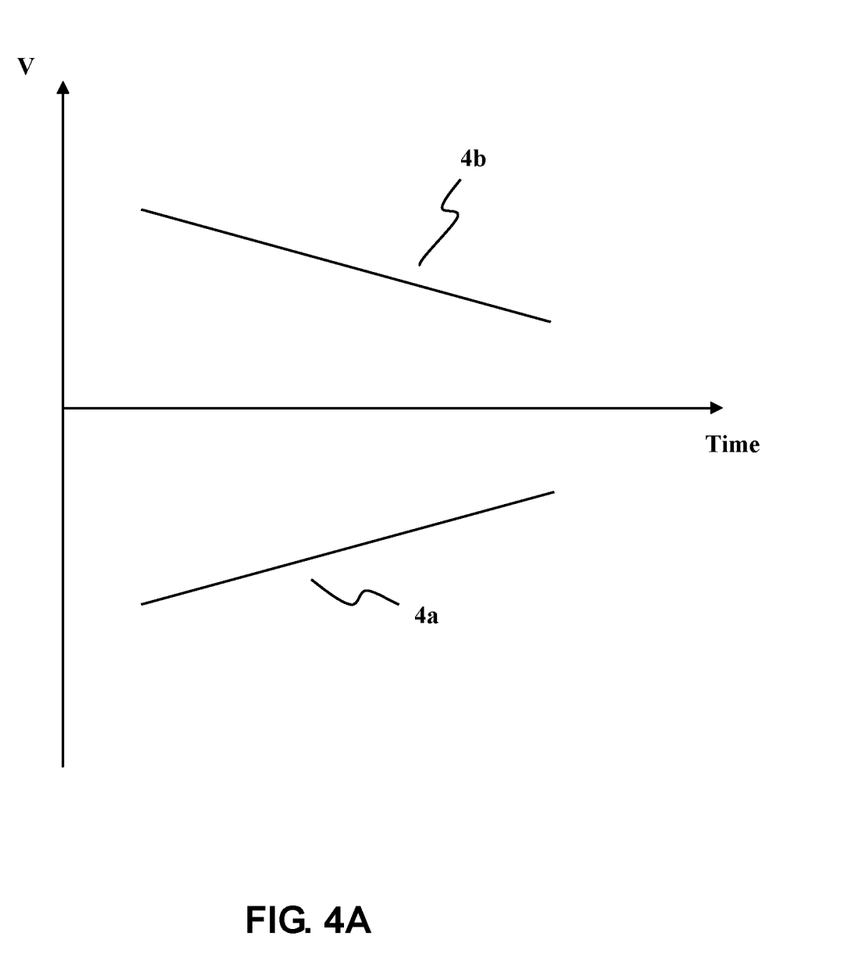
FIG. 4A is a graph depicting the signal of the AC portion of the low-side current and its converted signal after a negative unit gain amplifier.

Referring to FIG. 4, the inductance sensing circuit 410 is configured to acquire the rate of change in inductor current (di/dt). The inductance sensing circuit 410 may include an input to receive AC portion of the LC current $I_{LC\text{-}AC}$ supplied from the current sensing circuit 312. Line 4a in FIG. 4A depicted the AC portion of the LC current $I_{LC\text{-}AC}$. The signal is then converted as shown in line 4b in FIG. 4A via a negative unit gain amplifier 412. Two sample and hold circuits 414 and 416 are then used to obtain a peak current $I_{LC\text{-}peak}$ and valley current $I_{LC\text{-}valley}$ respectively by sampling the converted signal at the moments the LS switching element SW2 turns on and prior to the LS switching element SW2 turns off. Once the peak current $I_{LC\text{-}peak}$ and valley current $I_{LC\text{-}valley}$ are obtained, a third sample and hold circuit 418 with proper capacitor value can be used to obtain the rate of change in inductor current (di/dt) with the unit gain amplifier 415. In SPS applications, LS turn-on time is usually about 10 times or greater than the HS turn-on time. In one embodiment, the HS turn-on time is about 100 nanoseconds and the LS turn-on time is about 1100 nanoseconds. Accordingly, the rate of change in inductor current (di/dt) can be computed with the acquired two current measurements and the elapsed time and supplied the rate to the AC emulation circuit 420.

The AC emulation circuit 420 is used to compute the AC portion of the HS current $I_{HS\text{-}AC}$ based on the equation (4). The AC emulation circuit 420 includes a first input configured to receive the first input value indicating a magnitude of a difference between an input voltage $V_{in}$ used by the SMPS 300 to produce an output voltage $V_o$ to power a load and an output voltage $V_o$ produced by the SMPS 300. The AC emulation circuit 420 includes a second input configured to receive the second input value indicating a magnitude of an output voltage $V_o$ produced by the SMPS 300. The AC emulation circuit 420 includes a third input configured to receive from the inductance sensing circuit 410 a third input value indicating a magnitude of the rate of change in inductor current (di/dt). The AC emulation circuit 420 is configured to compute an AC portion of the HS current $I_{HS\text{-}AC}$ based on the first, second and third input values in accordance with the equation (4). The AC emulation circuit 420 has an output the AC portion of the HS current $I_{HS\text{-}AC}$ to the summing circuit 404 for combining with its DC portion.

Figure 5:
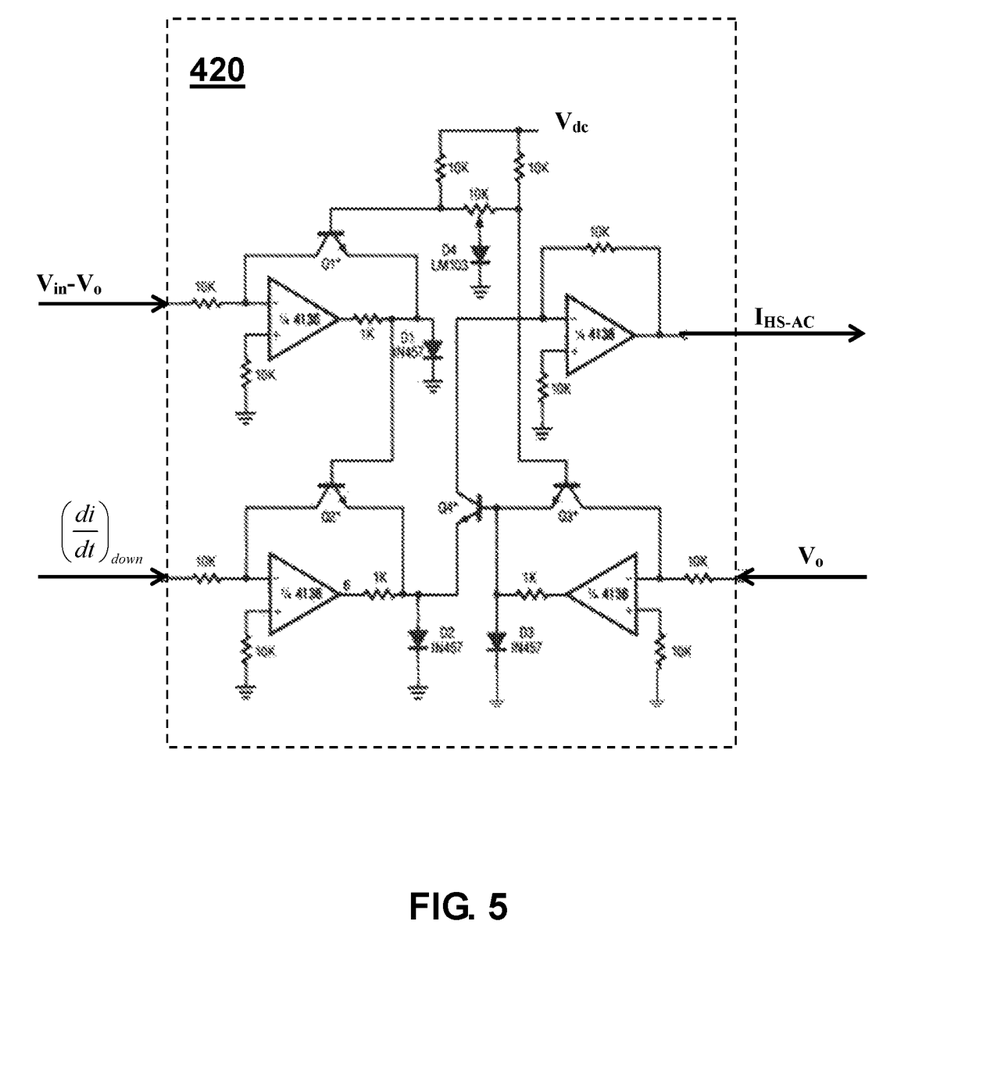
FIG. 5 is a circuit diagram illustrating an example of an AC emulation circuit according to aspects of the present disclosure.

The AC emulation circuit 420 may include a plurality of operational amplifiers to perform the mathematical operations for the equation (4) to obtain the AC portion of the HS current $I_{HS-AC}$. FIG. 5 is a circuit diagram illustrating an example of an AC emulation circuit 420 that includes a plurality of operational amplifiers and in a configuration to carry out the computation of dividing the first input value by the second input value and then multiplying it with the third input value according to the equation (4). Since configuration of the operational amplifiers to perform mathematical operations is well known in the field, detailed description FIG. 5 will not be provided here. It is noted that the configuration of the operational amplifiers shown in FIG. 5 is simply an example, and other configurations may be implemented to perform the mathematical operations for the equation (4).

Referring back to FIG. 4, the current emulation circuit 400 further includes a summing circuit 404 configured to combine the AC portion ($I_{HS-AC}$) and the DC portion ($I_{HS-DC}$) of the HS current and generate a current emulation signal indicating HS current $I_{HS}$ supplying to multiplexer 206.

A SMPS with the current detection and control circuit according to aspects of the present disclosure has an inductance sensing circuit 410 to track the rate of change in inductor current (di/dt) in real-time, thereby acquiring a real-time inductance values. Thus, an accurate HS current information may be obtained with the real-time inductance value.

While the above is a complete description of the preferred embodiments of the present invention, it is possible to use various alternatives, modifications, and equivalents. Therefore, the scope of the present invention should be determined not with reference to the above description but should, instead be determined with reference to the appended claims, along with their full scope of equivalents. Any feature, whether preferred or not, may be combined with any other feature, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for." Any element in a claim that does not explicitly state "means for" performing a specified function, is not to be interpreted as a "means" or "step" clause as specified in 35 USC §112, ¶6

What is claimed is:

1. A current detection circuit for detecting a current in a Switch Mode Power Supply (SMPS), wherein the SMPS has a first switch and a second switch coupled in series and an output filter including an inductor and a capacitor coupled to a switch node formed by the first and second switches, the current detection circuit comprising:
   a current sensing circuit configured to sense a current across the second switch and generating a current sensing signal indicating current information of the second switch, wherein the current sensing circuit has an input to couple to the switch node and an output to provide the current sensing signal; and
   a current emulation circuit configured to emulate current information of the first switch, wherein the current emulation circuit has a first input configured to receive the current sensing signal, and an output to provide a current emulation signal indicating current information of the first switch, wherein the current emulation signal comprises an AC portion and a DC portion of the current information of the first switch, and wherein the current emulation circuit comprises an inductance sensing circuit for acquiring a real-time rate of change in current, and an AC emulation circuit for computing the AC portion of the current information of the first switch based on the real-time rate of change in current.

2. The circuit of claim 1, further comprising a sample and hold circuit coupled between the current sensing circuit and the current emulation circuit, wherein the sample and hold circuit is configured to sample the current sensing signal supplied from the current sensing circuit to obtain a first current value of the second switch and wherein the sample and hold circuit is configured to supply a sampled current signal indicating the first current value of the second switch to the current emulation circuit.

3. The circuit of claim 2, wherein the DC portion of the current information of the first switch is generated based on the first current value of the second switch.

4. The circuit of claim 1, further comprising a multiplexer configured to generate an inductor current signal indicating current information of the SMPS based on the current sensing signal and the current emulation signal, wherein the multiplexer has a first input coupled to the current sensing circuit for receiving the current sensing signal indicating current information of the second switch, a second input coupled to the current emulation circuit for receiving the current emulation signal indicating current information of the first switch and an output for supplying the inductor current signal indicating current information of the SMPS to a current control unit for current monitoring and control.

5. The circuit of claim 1, wherein the current emulation circuit includes a summing circuit configured to combine the AC portion and the DC portion of the current information of the first switch and generate the current emulation signal indicating current information of the first switch.

6. The circuit of claim 1, wherein the AC emulation circuit has a first input configured to receive a first input value indicating a magnitude of a difference between an input voltage used by the SMPS to produce an output voltage to power a load and an output voltage produced by the SMPS, a second input configured to receive a second input value indicating a magnitude of the output voltage produced by the SNIPS, and a third input configured to receive a third input value indicating a magnitude of the real-time rate of change in current, wherein the AC emulation circuit is configured to compute the AC portion of current information of the first switch based on the first, second and third input values.

7. The circuit of claim 1, wherein the AC emulation circuit comprises a plurality of operational amplifiers to perform math operations in a configuration to generate the AC portion of current information of the first switch by an equation that: $(V_{in}-V_o)/V_o \times (di/dt)$, where $V_{in}$ represents an input voltage used by the SNIPS to produce an output voltage to power a load, $V_o$ represents an output voltage produced by the SNIPS and (di/dt) represents the real-time rate of change in current.

8. The circuit of claim 1, wherein the inductance sensing circuit comprises a circuit configured to acquire the real-time rate of change in current based on two sampled current values from the current sensing signal and an elapsed time between two samples.

9. The circuit of claim 1, wherein the inductance sensing circuit comprises a negative unit gain amplifier configured for converting the current sensing signal, a first and second sample and hold circuits configured for sampling the converted current sensing signal to obtain two current values of the current sensing signal, and a third sample and hold circuit for acquiring the rate of change in inductor current.

10. A method for detecting a current in a Switch Mode Power Supply (SMPS), wherein the SMPS has a first switch and a second switch coupled in series and an output filter including an inductor and a capacitor coupled to a switch node formed by the first and second switches, comprising:

sensing a current across the second switch and generating a current sensing signal indicating current information of the second switch by a current sensing circuit, wherein the current sensing circuit has an input coupled to the switch node and an output for providing the current sensing signal; and emulating current information of the first switch by a current emulation circuit, wherein the current emulation circuit has a first input configured to receive the current sensing signal, and an output for providing a current emulation signal indicating current information of the first switch, wherein the current emulation signal comprises an AC portion and a DC portion, and wherein emulating current information of the first switch comprising acquiring a real-time rate of change in current by an inductance sensing circuit and computing the AC portion of the current information of the first switch by an AC emulation circuit based on the real-time rate of change in current.

11. The method of claim 10, further comprising sampling the current sensing signal supplied from the current sensing circuit by a sample and hold circuit to obtain current values of the second switch including a first current value of the second switch, and supplying a sampled current signal indicating the first current value of the second switch to the current emulation circuit.

12. The method of claim 11, further comprising generating the DC portion of the current information of the first switch based on the first current value of the second switch.

13. The method of claim 10, further comprising generating an inductor current signal indicating current information of the SMPS by a multiplexer based on the current sensing signal and the current emulation signal and supplying the inductor current signal to a current control unit for current monitoring and control, wherein the multiplexer has a first input coupled to the current sensing circuit for receiving the current sensing signal indicating current information of the second switch, a second input coupled to the current emulation circuit for receiving the current emulation signal indicating current information of the first switch, and an output for supplying the inductor current signal to the current control unit.

14. The method of claim 10, further comprising combining the AC portion and the DC portion of the current information of the first switch by a summing circuit and generating the current emulation signal indicating current information of the first switch.

15. The method of claim 10, wherein computing the AC portion of the current information of the first switch by the AC emulation circuit is based on a first value indicating a magnitude of a difference between an input voltage used by the SMPS to produce an output voltage to power a load and an output voltage produced by the SMPS, a second value indicating a magnitude of the output voltage produced by the SMPS, and a third value indicating a magnitude of the real-time rate of change in current.

16. The method of claim 10, wherein computing the AC portion of the current information of the first switch by the AC emulation circuit comprises using a plurality of operational amplifiers to perform math operations in a configuration to generate the AC portion of current information of the first switch by an equation that: $(Vin-Vo)/Vo \times (di/dt)$, where Vin represents an input voltage used by the SMPS to produce an output voltage to power a load, Vo represents an output voltage produced by the SMPS and $(di/dt)$ represents the real-time rate of change in current.

17. The method of claim 10, wherein acquiring the real-time rate of change in current comprises using two sampled current values from the current sensing signal and an elapsed time between two samples.

18. The method of claim 10, wherein acquiring the real-time rate of change in current comprises converting the current sensing signal by a negative unit gain amplifier, sampling the converted current sensing signal to obtain two current values of the current sensing signal by a first and a second sample and hold circuits, and acquiring the rate of change in inductor current by a third sample and hold circuit.

* * * * *